United States Patent
Schuetze

(10) Patent No.: US 8,639,925 B2
(45) Date of Patent: Jan. 28, 2014

(54) METHOD FOR PROTECTING A SENSOR AND DATA OF THE SENSOR FROM MANIPULATION AND A SENSOR TO THAT END

(75) Inventor: Torsten Schuetze, Moeglingen (DE)

(73) Assignee: Robert Bosch GmbH, Stuttgart (DE)

( * ) Notice: Subject to any disclaimer, the term of this patent is extended or adjusted under 35 U.S.C. 154(b) by 524 days.

(21) Appl. No.: 12/760,718

(22) Filed: Apr. 15, 2010

(65) Prior Publication Data
US 2010/0268949 A1 Oct. 21, 2010

(30) Foreign Application Priority Data
Apr. 15, 2009 (DE) .................. 10 2009 002 396

(51) Int. Cl.
*H04L 9/32* (2006.01)
(52) U.S. Cl.
USPC .......................... 713/168; 713/170; 713/181
(58) Field of Classification Search
USPC ......... 713/150, 153, 155, 168–170, 172, 176, 713/180–181
See application file for complete search history.

(56) References Cited

U.S. PATENT DOCUMENTS

| | | | |
|---|---|---|---|
| 6,507,907 B1 * | 1/2003 | Takahashi et al. | 713/150 |
| 2002/0174332 A1 * | 11/2002 | Vialen et al. | 713/152 |
| 2003/0156715 A1 * | 8/2003 | Reeds et al. | 380/37 |
| 2005/0076216 A1 * | 4/2005 | Nyberg | 713/171 |
| 2006/0056623 A1 * | 3/2006 | Gligor et al. | 380/28 |
| 2006/0143453 A1 * | 6/2006 | Imamoto et al. | 713/169 |
| 2007/0083750 A1 * | 4/2007 | Miura et al. | 713/155 |
| 2007/0245147 A1 * | 10/2007 | Okeya | 713/181 |
| 2008/0044014 A1 * | 2/2008 | Corndorf | 380/37 |
| 2008/0046731 A1 * | 2/2008 | Wu | 713/171 |
| 2008/0253569 A1 * | 10/2008 | Lim et al. | 380/258 |
| 2008/0313698 A1 * | 12/2008 | Zhao et al. | 726/1 |
| 2009/0089583 A1 * | 4/2009 | Patel | 713/171 |
| 2009/0268911 A1 * | 10/2009 | Singh | 380/270 |
| 2010/0031052 A1 * | 2/2010 | Kim et al. | 713/181 |
| 2010/0042839 A1 * | 2/2010 | Ho | 713/169 |
| 2012/0303973 A1 * | 11/2012 | Newsome et al. | 713/189 |

\* cited by examiner

*Primary Examiner* — Darren B. Schwartz
(74) *Attorney, Agent, or Firm* — Kenyon & Kenyon LLP

(57) ABSTRACT

A method for protecting a sensor and data of the sensor from manipulation, as well as a sensor to that end; in the course of the authentication, a random number being sent by a control unit to the sensor; in order to recognize manipulation of the sensor data, the sensor data from the sensor to the control unit being provided with a cryptographic integrity protection; and to prevent replay attacks, additional time-variant parameters being added to the sensor data, the sensor data, together with the integrity protection and the added time-variant parameters, being sent by the sensor to the control unit. In this context, after the authentication of the sensor, the random number or a part of the random number or a number obtained from the random number by a function is utilized for the time-variant parameters.

12 Claims, 3 Drawing Sheets

US 8,639,925 B2

METHOD FOR PROTECTING A SENSOR AND DATA OF THE SENSOR FROM MANIPULATION AND A SENSOR TO THAT END

RELATED APPLICATION INFORMATION

The present application claims priority to and the benefit of German patent application no. 10 2009 002 396.8, which was filed in Germany on Apr. 15, 2009, the disclosure of which is incorporated herein by reference.

FIELD OF THE INVENTION

The present invention relates to a method for protecting a sensor and data of the sensor from manipulation, as well as a sensor to that end.

BACKGROUND INFORMATION

In modern engines, a rail pressure, which is adjusted by a pressure-control valve and monitored by a rail-pressure sensor, is an important parameter for influencing and/or regulating the power output of the engine. In known methods heretofore, rail-pressure sensors RPS having an analog interface were utilized. In the past, the data of RP-sensors were a favorite target of manipulation, so-called tuning attacks. Two important attack scenarios are:
1. Replacement of the RP-sensor by a similar model having different characteristic properties.
2. Manipulation of the analog pressure data on the transmission link, for instance, by inserting a resistor (→lower voltage→feigned lower pressure).

Future rail-pressure sensors can be equipped with a digital PSI5-interface. In this connection, one essential requirement is that there should be indisputably strong information as to whether manipulation was carried out.

Protection goal 1 (preventing the replacement of the sensor) may be achieved by "authentication" of the sensor at the control unit. For example, challenge-response protocols are used for this purpose In the related art, unilateral authentication methods according to "*ISO/IEC 9798-2, Information technology—Security Techniques—Entity Authentication—Part 2 Mechanisms using symmetric encipherment algorithms*" ISO/IEC, 1999 are often used for the authentication, either as two-pass unilateral authentication protocol with nonces or as one-pass unilateral authentication protocol with time stamps/sequence counters.

Protection goal 2 (recognition of manipulation of the sensor data) may be achieved by integrity-protection methods. In the related art, standardized cryptographic methods, for instance, message authentication codes or digital signatures, e.g., "*ISO/TEC 9797-1. Information technology—Security techniques—Message Authentication Codes (MACs)—Part 1: Mechanisms using a block cipher. ISO/IEC,* 1999" or "*ISO/IEC 9797-2. Information technology—Security techniques—Message Authentication Codes (MACs)—Part 2: Mechanisms using a dedicated hash-function. ISO/IEC,* 2002" are used for protecting the integrity of the data.

Moreover, to prevent replay attacks, according to the related art, additional so-called time-variant parameters (random numbers, time stamps, sequence numbers) are added to the data to be safeguarded by integrity protection.

SUMMARY OF THE INVENTION

The method of the present invention and the sensor of the present invention, respectively, make it possible to link together standard methods for authenticating a sensor and standard methods for a transaction authentication of data of the sensor—the sensor data being transmitted between the sensor and a control unit—by utilizing random data from the authentication method to represent the time-variant parameters of the transaction-authentication method. A tight cryptographic coupling of authentication and transaction authentication is thereby achieved, which constitutes a distinct security advantage of the method according to the present invention. Furthermore, at the same time, one also saves on the implementation of a random-number generator on the sensor side, since the random-number generator often present as standard in control units is sufficient for all method steps. Overall, therefore, an extremely secure method is obtained for sensor authentication and for transaction authentication of sensor data, accompanied by reduced technical expenditure.

Further advantages and improvements are derived from the features delineated herein.

In one advantageous development, the time-variant parameters are altered in each step of the transaction authentication. This procedure corresponds to a sequence counter, and permits an especially tight cryptographic coupling of the method parts, authentication and transaction authentication, and therefore a further gain in security. It is particularly advantageous, because especially easy to realize, if the change in the time-variant parameters corresponds to a stepwise incrementation.

In one exemplary embodiment, a challenge-response method is utilized as authentication method, which is distinguished by particularly high security. Also advantageous for protecting the integrity of sensor data is a use of MAC methods, which likewise satisfy high security standards, the extremely secure EMAC and OMAC methods being particularly expedient.

In special embodiments, the time-variant parameters take the form either of time stamps, sequence counters or random numbers. Above all, these forms bring with them the advantage of an especially simple, but still appropriate realization of the method according to the present invention.

Exemplary embodiments of the present invention are shown in the drawing and explained in greater detail in the following description. The drawing is merely by way of example, and does not limit the general inventive idea. Identical or identically acting parts are provided with identical reference numerals.

DETAILED DESCRIPTION

Hereinafter, the example of a RP [rail pressure]-sensor and a control unit in a motor vehicle is referred to expediently to describe the invention. However, this does not represent any restriction of the exemplary embodiments and/or exemplary methods of the present invention to this example, since the overall security concept described is conceived generally for assuring the security of the communication between any control unit and a sensor.

Figure 1:
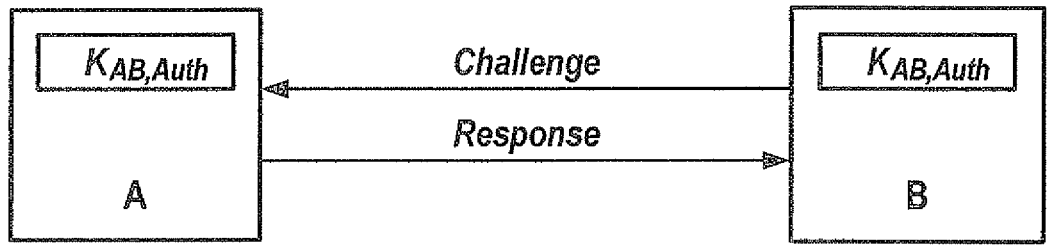
FIG. 1 show a schematic representation of a system for authenticating a sensor A at a control unit B with the aid of a challenge-response method.

FIG. 1 shows a schematic representation of a system for authenticating a sensor A at a control unit B with the aid of a challenge-response method. In this context, control unit B sends a challenge to sensor B [sic; A], which answers with a response for the authentication. In this case, a concrete method is indicated schematically, which is part of a comprehensive security concept that meets high security demands, and in cryptographically reliable fashion, detects attacks of the types pointed out above as well as further security threats and violations.

A first step involves a challenge-response method for authenticating the RP-sensor at the control unit ECU [electronic control unit]. The goal of the authentication is to determine whether the RPS has a valid authentication feature, i.e., knowledge of an encryption key at the instant of the authentication, and to permanently link this feature to its identity, e.g., a serial number (key points: freshness, liveliness [sic; liveness] of key). In FIG. 1, this authentication is indicated schematically by the challenge-response method.

Figure 2:
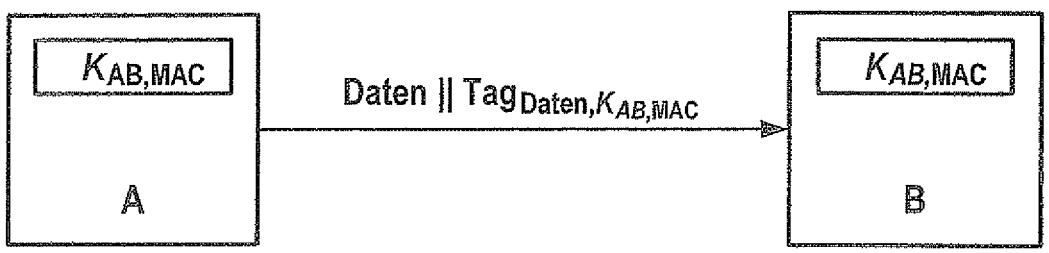
FIG. 2 show a schematic representation of a system for protecting the integrity of the sensor data.

FIG. 2 shows a schematic representation of a system for protecting the integrity of the sensor data. In this second step of the security concept, after the authentication—i.e., the receiver of the data, namely, control unit (ECU) B, knows that it is communicating with an authenticated transmitter, namely, RP-sensor A—the transmitted data are continually provided with integrity protection, which may be with time-variant parameters such as random numbers, sequence numbers (sequence counters) or time stamps. This is represented in FIG. 2 by appending a tag to the data transmitted by sensor A to control unit B, the tag representing the time-variant parameters. After the processing of the pressure data, these time-variant parameters are checked cryptographically, and a manipulation of the RPS data is reliably recognized cryptographically, i.e., no additional latency times occur in the real-time data processing due to the cryptography, and manipulations are therefore able to be detected.

What are termed message authentication codes MAC are proposed as an efficient method for achieving the cryptographic integrity protection. In the case of what are called the CBC-MAC methods, two further encryption keys are used; in a further modified proposal, what is referred to as OMAC, one even makes do with only one additional integrity key. Specifically proposed as realization option for the RP-sensor having the digital PSI5 interface are: EMAC as well as CMAC, also known as OMAC. Both methods use a symmetrical block cipher; proposed are either the AES-128, see "FIPS 197, Advanced Encryption Standard (AES), Federal Information Processing Standards Publication 197, November 2001, http://csrc.nist.gov/", key length k=128 bits, block width n=128 bits, or alternatively, PRESENT, see "A. Bogdanov, L. R. Knudsen, G. Leander, C. Paar, A. Poschmann, M. J. B. Robshaw, Y. Seurin, and C. Vikkelsoe, PRESENT: An ultra-lightweight block cipher, in P. Pallier and I. Verbauwhede, editors, Proceedings of CHES 2007, volume 4727 of Lecture Notes in Computer Science, Pages 450-467, Springer-Verlag, 2007", key length k=128, block width n=64. PRESENT is still a relatively new block cipher, it is much less fully developed than AES; meanwhile, there are also first reports about theoretical cryptanalysis attacks.

In a third step of the security concept, in order to prevent what are termed replay attacks, in addition to the useful data, i.e., pressure values, random numbers are inserted into the data to be safeguarded by integrity protection. These random numbers are transmitted in plaintext to the ECU and verified at the same time with the aid of MAC.

In order to obtain a permanent binding of the authentication and the integrity protection, in a fourth, decisive step of the envisaged security concept, the random numbers of both steps, that is, as explained below, the time-variant parameters and the random numbers of both steps are linked. In this manner, a "transaction authentication" is achieved. By this linking of the two substeps, authentication and integrity protection (thus then also transaction authentication), one achieves a tight, cryptographic coupling of both parts, and at the same time, saves on the implementation of a random-number generator on the sensor side.

The authentication should be carried out promptly after an engine start, that is, in the first minutes. However, it is not necessary to accomplish it directly in the startup phase. The integrity protection does not take place until after the authentication; this integrity protection makes no sense cryptographically beforehand. While the authentication takes place relatively seldom, at least after each engine start and after the loss of several data packets or of synchronism, the pressure data are continually provided with an integrity tag, that is, for example, every t=16 blocks. The random number transmitted during the authentication from the ECU to the sensor may be used as sequence counter to link the method steps, for example, as a component in the integrity protection, and may be incremented with each (t=16)×(n=128)-bit block.

If, as standard, the integrity protection is used in the case of each pressure-data packet, then prior to the authentication, either the MAC data should be ignored, which is unfavorable, or should be used with the random numbers available on the RP-sensor. After the authentication has taken place, the negotiated sequence counter is used.

In the following, the method for transaction authentication according to the exemplary embodiments and/or exemplary methods of the present invention is described in detail using an exemplary embodiment. While steps 1-3 of the security concept presented first are known in part from the related art from other fields of application, the decisive fourth step of the security concept according to the present invention, which is explained at the end of the detailed description based, inter alia, on FIG. 6, is obtained from a linkage of the previous method steps.

The cryptographic security goals, namely, authenticity of the transmitter and of the data, integrity of the data as well as freshness of the encryption keys and data, and prevention of replay attacks are achieved using the following mechanisms:

Authentication by challenge-response method (encryption of a challenge, together with identity); integrity protection by message authentication codes based on the CBC mode, together with suitable padding and MAC strengthening, i.e., EMAC and CMAC; prevention of replay attacks by insertion of random numbers, together with the pure useful data; secure cryptographic linking of both protocol parts by using one part of the challenge as sequence counter for the integrity protection; only a single basic element, a symmetrical block cipher, is needed for all mechanisms—as realization option, specifically AES-128 or, alternatively, PRESENT are proposed; furthermore, because of the linkage of both protocol parts, a random-number generator is needed only on the control unit.

Let A be the RP-sensor and B the control unit ECU. The goal is the authentication of A with respect to B, that is, A proves to B that it has a shared secret, an encryption key, at the instant of the authentication. Both participants in the protocol possess three keys in common:

$K_{AB,Auth}$—common authentication key $K_{AB,MAC1}$—common message authentication code key 1

$K_{AB,MAC2}$—common message authentication code key2

One common message-authentication-code key 1, $K_{AB,MAC1}$, is sufficient in the case of the CMAC algorithm. Let $Enc_K$ be an encryption algorithm with key K of length k and block width n, for instance, $Enc_K$=AES, k=length (K)=128, n=128. Alternatively, $Enc_K$=PRESENT, k=length (K)=128, n=64 could be considered, for example. Furthermore, let $ID_A$ and $ID_E$ be system-wide unique identities of the users, for instance, 32-bit-long serial numbers or type part numbers. The length of the serial numbers is not significant cryptographically. It is important that all users in the overall system, that is, not only an engine/vehicle, are able to be identified clearly. This plays a central role in the key management, as described later.

Furthermore, in this example, let $R_A$ and $R_B$ be random numbers generated by A and B, respectively, whose suitable length is specified later.

Figure 3:
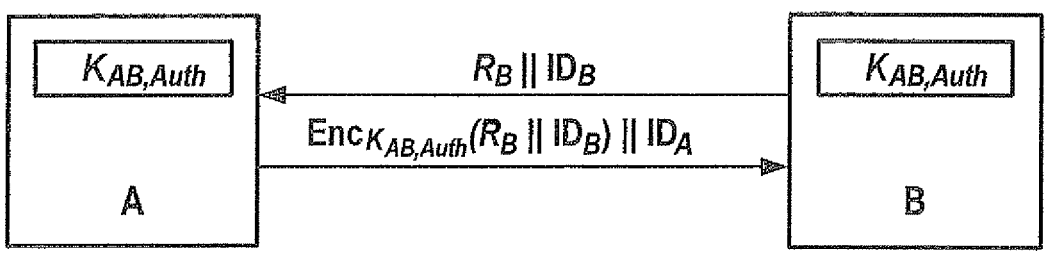
FIG. 3 show a schematic representation of a system for authenticating a sensor A at a control unit B.

In the following, an exemplary authentication of sensor A with respect to control unit B is described. Steps 1-3 are represented schematically in FIG. 3.

1. B generates a 64-bit random number $R_B$
2. B transmits this random number $R_3$ together with its identity $ID_B$ to A:

B→A: $R_B$ $ID_B$ (64 bit 32 bit)

3. A encrypts the message $R_B$ $ID_B$, i.e., $Enc_{K_{AB,Auth}}$ (RB $ID_B$) and sends it, together with $ID_A$, back to B:

A→B: $EnC_{K_{AB,Auth}}$ ($R_B$ $ID_B$) $ID_A$ (128 bit 32 bit)

4. Immediately after completion of the protocol step in 2., B on its part is thus able to begin to calculate the response y=$Enc_{K_{AB,Auth}}$ ($R_B$ $ID_B$). After receipt of response y' in 3., it compares y to transmitted response y':

Thus: y=y'=$Enc_{K_{AB,Auth}}$ ($R_B$ $ID_B$)?

Moreover, it compares the identity of A to the desired, that is, $ID_A$=$ID'_A$?

Only if both comparisons are successful has A successfully authenticated itself with respect to B.

In the following, an expedient modification of steps 3. and 4. is described. In order to save on communication bandwidth, only the most significant 64 bits of the encryption are transmitted in step 3, and consequently also compared in 4.

This is not synonymous with the use of an encryption method having a 64-bit block width, 3'. A→B: $msb_{127,\ldots,64}$[$Enc_{K_{AB,Auth}}$($R_B$ $ID_B$)] $ID_A$ (64 bit 32 bit)

In the following, the overall method with respect to authentication 1 is presented.

1. B generates a 64-bit random number $R_B$
2. B transmits this random number $R_B$ together with its identity $ID_B$ to A:

B→A: $R_B$ $ID_B$ (64 bit 32 bit)

3. A encrypts the message $R_B$ $ID_B$, i.e., $Enc_{K_{AB,Auth}}$ ($R_B$ $ID_B$), and sends the 64 most significant bits, together with $ID_A$, back to B A→B: $msb_{127,\ldots,64}$ [$Enc_{K_{AB,Auth}}$ ($R_B$ $ID_B$)] $ID_A$ (64 bit 32 bit)

4. Immediately after completion of the protocol step in 2., B on its part is thus able to begin to calculate the response y=$msb_{127,\ldots,64}$[$Enc_{K_{AB,Auth}}$ ($R_B$ $ID_B$)]. After receipt of response y' in 3., it compares y to transmitted response y':

Thus: y=y'=$msb_{127,\ldots,64}$ [$Enc_{K_{AB,Auth}}$ ($R_B$ $ID_B$)]?

Moreover, it compares the identity of A to the desired, that is:

$ID_A$=$ID'_A$?

Only if both comparisons are successful has A successfully authenticated itself with respect to B.

In addition, the following should be noted.

(i) The step of the security concept proposed here is essentially the ISO/IEC 9798-2 two-pass unilateral authentication protocol. For this, see "ISO/IEC 9798-2, Information technology—Security techniques—Entity Authentication—Part 2: Mechanisms using symmetric encipherment algorithms ISO/TEC, 1994." This holds true except for the modification of the transmission of only the 64 most significant bits of Enc.

(ii) To prevent replay attacks, that is, recording of the entire traffic and replay in later protocol sequences, the random number $R_B$ is used in the protocol. Cryptographically, it must be a "nonce=number used only once." In the application scenario considered, a length of 64 bits is viewed as adequate to prevent replay attacks in the authentication. In the past, shorter time-variant parameters, e.g., WEP encryption in the case of WLAN 802.11b, KeeLoq, already resulted in attacks and/or exploitable weaknesses in the method. Further remarks concerning the necessity of the authentication and alternative possibilities are found hereinafter. A random-number generator RNG is needed for generating the random numbers in control unit B. In the case of deterministic RNGs, the random-number generator should have the property K3 high. For this, see "Bundesamt für Sicherheit in der Informationstechnik [Federal Office for Security in Information Technology] BSI, AIS 20: Funktionalitätsklassen und Evaluationsmethodologie für deterministische Zufallszahlengeneratoren, Anwendungshinweise und Interpretationen zum Schema [Functionality Classes and Evaluation Methodology for Deterministic Random Number Generators, Application Instructions and Interpretations with Respect to the Schema] (AIS) Version 1, 2.12.1999, BSI, 2001", to be found under "http://www.bsi.bund.de/zertifiz/zert/interpr/ais20.pdf."

In the case of physical RNGs, it should at least have the property P1 high, better would be P2 high. For this, see "Bundesamt für Sicherheit in der Informationstechnik [Federal Office for Security in Information Technology] BSI, AIS 31: "Funktionalitätsklassen und Evaluationsmethodologie für physikalische Zufallszahlengeneratoren, Anwendungshinweise und Interpretationen zum Schema [Functionality Classes and Evaluation Methodology for Physical Random Number Generators, Application Instructions and Interpretations with Respect to the Schema] (AIS) Version 1, 25.9.2001, BSI, 2001", to be found under "http://www.bsi.bund.de/zertifiz/zert/interpr/ais3i.pdf." For this, see also "W. Killmann and W. Schindler, Ein Vorschlag zu: Funktionalitätsklassen und Evaluationsmethodologie für physikalische Zufallszahlengeneratoren [A Proposal Concerning Functionality Classes and Evaluation Methodology for Physical Random Number Generators], Technical Paper with respect to (AIS) 31, Version 3.1, 25.9.2001, BSI, 2001", to be found under "http://www.bsi.bund.de/zertifiz/zert/interpr/trngkr31.pdf."

(iii) The exemplary selection of $R_B$=64 leads to an attack complexity of $2^{33}$=$2^{64/2+1}$ communication sessions accompanied by simultaneous storage of $2^{64/2} \times 2^{32}$ pairs (RB $msb_{127\ldots 0}$ $Enc_K$ ($R_B$)) (64 bit 64 bit) for a simple two-step dictionary attack. For that, see, for example, "Audrey Bogdanov and Christof Paar, On the Security and Efficiency of Real-World Lightweight Authentication Protocols, In Secure Component and System Identification, March 2007, Workshop Record of SECSI, Berlin, Mar. 17-18, 2008." It is noteworthy that in the RP-sensor application scenario, the communication to the transmitter (challenge) is slower by orders of magnitude than the communication from the transmitter to the control unit (response). The simple guessing of the 64-bit response $msb_{127\ldots 0} Enc_K(R_B)$ has an attack complexity of $2^{64-1}=2^{63}$. The identities $ID_A$, $ID_B$ are needed in the system, since later a use of more sensors is planned, as well. They are assumed, for example, as 32-bit values, but without greater problems, may also be 64 bits long. Should the data packets $R_B ID_B$ become longer than 128 bits, for instance, due to selection of an 80-bit ID, then it is necessary to pay attention that for $Enc_K(R_B ID_B)$, a more secure mode of operation (execution mode) is used, for instance, CBC encryption with random IV and padding, and no longer the simple ECB mode, that is, the objective is feasible in principle, but more costly.

For instance, $R_B=128$ would be a better value for the length of the challenge from the standpoint of cryptography. Then both a scan attack (guessing of the response) and dictionary attack would have an attack complexity of approximately $2^{64}$. The message blocks would then admittedly have exceeded the limit of 128 bits, however, shorter identifiers ID are not possible.

Figure 4:
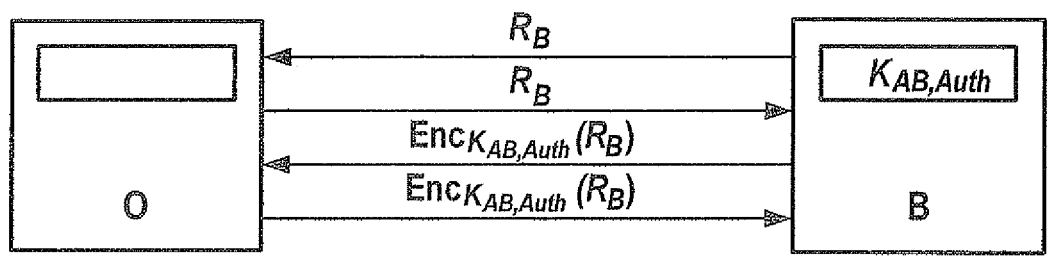
FIG. 4 show a schematic representation for clarifying a reflection attack in the case of simple authentication.

(iv) The proposed method effectively prevents what are termed reflection attacks, sometimes also known as impersonation or parallel-sessions attack. The simplified protocol:
2. B→A: $R_B$ (64 bit)
3. A→$Enc_{K\,AB,\,Auth}$ (RB) (128 bit)
that is, without identities ID, may be attacked, in that attacker O immediately reflects random number $R_B$ and sends [it] back to B. B answers this parallel second session with the calculated value $Enc_{K\,AB,\,Auth}(R_B)$, which O on its part uses as response. FIG. 4 shows a schematic representation of such a reflection attack in the case of simple authentication.

A simple countermeasure, without additional implicit assumption about the behavior of A and B, is the inclusion of the identity in the text to be encrypted, i.e., $Enc_{K\,AB,\,Auth}(R_B\,ID_B)$.

(v) Instead of the encryption function Enc, a keyed hash function HMAC, a general hash function such as SHA-256, or a message authentication code (MAC) such as CBC-MAC may also be used in the protocol. However, these realization options would all lead to higher expenditure.

(vi) The authentication of the challenge, that is, B→A: $R_B$,MAC($R_B$) is dispensed with in this exemplary embodiment for reasons of expenditure and taking into consideration the comments in (iii).

(vii) The protocol proposed here by way of example is a "two-pass unilateral authentication protocol with nonces" (unilateral two-pass authentication protocol with numbers used only once). In cryptography, the search is always for a protocol having the lowest number of protocol passes, and nevertheless, superior security properties. In general, it can be said that usually one gets along with one protocol pass less if, instead of the nonces, random numbers, one uses either a time stamp or a synchronous counter, sequence number (sequence counter/sequence number). In particular, the time stamp or the counter must not be set or reset by A, the prover. In this case, all protocol actions would come from A and could therefore be recorded.

The decisive point is thus: If only one unidirectional communication is able to take place from A to B, and neither time stamps nor sequence counters, which must be present synchronously and in non-manipulable manner in the system, may be used, then all protocol actions are initiated by A, B is passive, and the prover/claimant A is able theoretically to previously record and replay all data. Thus, in principle, it is not possible to dispense with the backward channel and nevertheless to achieve the security demanded, e.g., by implicit authentication.

For this, reference is made to "Walter Fumy and Hans-Peter Riess, Kryptographie, Entwurf, Einsatz and Analyse symmetrischer Kryptoverfahren [Cryptography, Outline; Use and Analysis of Symmetrical Cryptographic Methods], R. Oldenbourg Verlag, Munich, Vienna, second edition, 1994." It is taught there that the use of time stamps requires the availability of a sufficiently exact and reliable system time. In this case, the verifying entity is able to check the validity of a message based on the associated time stamp. A message is accepted if the deviation between the instant of the message receipt and the time stamp does not exceed a threshold value. If the intention is also to prevent a replay of transactions within the tolerated time interval, then a long record of the accepted messages must be kept accordingly. However, this is impossible within the context of a sensor. The synchronization of the clocks at the participant entities constitutes a certain difficulty in the practical use of time stamps; however, their frequently unsatisfactory security against manipulation may also be problematic. The basic idea of sequence numbers is that, given an authentication mechanism with respect to each sequence number, only one message or one message within a specific logical period of time is accepted. The use of sequence numbers requires a certain administrative expenditure, which accrues for each corresponding communication relationship. A minimum requirement is the storage of the respective instantaneous sequence number for each direction of communication. Synchronization mechanisms must also be provided, e.g., for the case of a system failure.

Based on this excerpt from a cryptography textbook, one can see that it is not possible to dispense with any form of the bidirectional or synchronous communication in the case of an authentication. For the exemplary embodiment of a sensor/control-unit communication via a PSI5 bus, this unequivocally answers in the negative the question as to whether it is possible to dispense with a synchronous, bidirectional PSI5 communication between ECU and sensor.

(viii) For the sake of completeness, the corresponding "one-pass unilateral authentication protocol with time stamps/sequence counters" according to ISO/IEC 9798-2 is also indicated. For this, see "ISO/IEC 9798-2, Information technology—Security techniques—Entity Authentication—Part 2: Mechanisms using symmetric encipherment algorithms ISO/IEC, 1994".

A→B: $Enc_{K\,AB,\,Auth}(TS_A\,ID_B)\,ID_A$ with $TS_A$—time stamp, generated by A. The $ID_A$ transmitted in plaintext is of no direct cryptographic significance, it is not in the ISO standard.

In the following, design principles for cryptographic protocols will be discussed. There are a few principles which should be observed for designing a cryptographic protocol. In this connection, reference is made to "Colin Boyd and Anish Mathuria, Protocols for Authentication and Key Establishment, Springer, 2003, Page 31."

The protocols specified in this literature may be found there as protocols 3.4 and 3.5, see pages 77 and 78; the symbol $\{\ \}_K$ stands for authenticated encryption with key K.

A→B: $\{T_A, B\}_{K_{AB}}$

Protocol 3.4: ISO/IEC 9798-2 one-pass unilateral authentication protocol

1. B→A: $N_B$
2. A→B: $\{N_A, B\}_{K_{AB}}$

Protocol 3.4: ISO/IEC 9798-2 two-pass unilateral authentication protocol

From Table 3.2 to be found in the literature on page 80, one may deduce that both protocols 3.4 and 3.5 satisfy the desired properties of liveness, freshness of key, and entity authentication of A, and that no known attacks exist, although no formal security proof exists. The security of both protocols was widely studied in the past. Formal security proofs of protocols have only recently become a tough demand placed on standards. For technical reasons, the resulting protocols are often somewhat more extensive than the classic authentication protocols. The protocol selected by way of example in the following and based on protocol 3.5 is the best of all protocols presented there for which no attack yet exists to date.

In the following, the integrity protection of the sensor data, the second step of the overall security concept, is discussed in greater detail. In addition to the prevention of the replacement of sensors, the prevention or, more precisely, the detection and the proof of modifications of the sensor data are of utmost importance. Cryptographic techniques for the protection of data focus on the origin of the data, i.e., data origin authentication, integrity of sender, and on the integrity of the data, that is, the fact that the data were not modified. Other important aspects are the timeliness, the sequence of data and, if appropriate, the intended receiver. These properties are strongly dependent on the application. For example, the question presents itself as to whether the replay of unmodified data, e.g., in the event of packet losses, is a cryptographic attack. Therefore, no time-dependent states are incorporated into the basic cryptographic mechanisms themselves.

The designations indicated above are used in the following. Thus, let $x=(x_1, \ldots, x_t)$ be the t message text blocks of block width n, possibly after the padding has been carried out. To achieve the goal of authenticity and integrity of the data, respectively, essentially three cryptographic approaches may be differentiated: authentication codes, digital signatures and message authentication codes.

Authentication codes are combinatory objects whose probability of success for an attack may be calculated explicitly and is independent of the computing power of the attacker. These days, they are not very prevalent; often a new key is needed for each transaction.

Digital signatures are asymmetrical methods, which are slower than symmetrical methods by the factor 100 to 1000. In the case of asymmetrical methods, each sensor/user A has its own key pair $pk_A$, $sk_A$ (public key, secret/private key). In the case of the signature, user A hashes message x and employs the signature-generation method GenSig using its private key $sk_A$ and sends the resulting signature s to B, that is, A→B: x, s=$GenSig_{sk_A}$ (h(x))

B: $VerSig_{pk_A}$ (x', s) valid? Accept or Reject.

B receives message x' and signature s and checks the signature with the aid of the signature-verification method VerSig, using the authentic public key of A. Nowadays, for example, mostly RSA PKCS#1 v1.5 signatures are used in the automotive sector:

1. RSA 1024 bit: GenSig: 1024 $bit^{1024 bit}$, VerSig: 1024 $bit^{16\ bit}$; signature, module, private key per 128 byte, public key 16 bit
2. RSA 2048 bit: GenSig: 2048 $bit^{2048 bit}$, VerSig: 2048 bites bit; signature, module, private key per 256 byte, public key 16 bit ECC (Elliptic Curve Cryptography) signatures have substantially better properties.
3. ECDSA 160 bit—security comparable to RSA 1024 bit: GenSig: one scalar point multiplication, VerSig: two scalar point multiplications; signature 40 byte
4. ECDSA 256 bit—security comparable to RSA 2048 bit: GenSig: one scalar point multiplication, VerSig: two scalar point multiplications; signature 80 byte In addition to integrity protection, digital signatures furnish the property of non-repudiation, which may be helpful legally in the event of disputes between the communication partners. Since in the sensor context described by way of example, both communication partners operate within the auto system (engine or control unit B as well as sensor A) and control unit B will scarcely contest a message received from sensor A, non-repudiation is not necessary in this specific case.

In the following, message authentication codes are explained. As discussed above, a simple encryption of a tag, e.g., linear tag or hash digest, does not solve the problem of the authenticity of messages. A message authentication code is made up of a:

1. Key-generation algorithm: Output: symmetrical key K, bit length k, for example, k=56 . . . 256,
2. MAC-generation algorithm: Input: text x, key K, Output: $MAC_K$ (x)—bit string of the length m, for example, m=24 . . . 128,
3. MAC-verification algorithm: Input: text x, MAC-value $MAC_K(x)$, key K, Output: accept or reject.

The security of a MAC-algorithm may be described informally as follows—generally accepted security model: It should be virtually impossible, computationally infeasible, for an attacker to generate an "existential forgery", that is, any permissible falsification using what is referred to as an adaptive chosen text attack; in particular, this also includes MAC-verification queries; see, for example, "Jonathan Kahtz and Yehuda Lindell, Introduction to Modern Cryptography, CRC Publishing, 2007, page 16." If a message authentication code is secure in this sense, then in particular, the security is not dependent on the special coding of the data.

Four typical attacks on MAC algorithms are:
1. Brute force key search→sufficiently large key space, for example, k 80 for medium term security.
2. Guessing of the MAC value→success probability max $(2^{-k}, 2^{-m})$. For most applications, k>m and m=32 . . . 64 apply.
3. Generic falsification based on internal collisions. This is the case particularly when using the proposed modified "integrity-protection methods" indicated above.
4. Attacks based on cryptoanalytical weaknesses.

To clarify the two last attack scenarios, the following is cited: "Bart Preneel, MAC algorithms, In van Tilborg", for this, see "Henk C. A. van Tilborg, editor, Encyclopedia of Cryptography and Security, Springer, 2005, page 365."

A differentiation is made between MACs which are based on block ciphers, and MACs which are based on dedicated hash functions. In addition, some time ago, work was begun in international forums to standardize MACs with "universal" hash functions; see ISO/IEC 9797-3. However, they are not yet widespread.

In the following, keyed hash functions—HMAC—are explained. Among the keyed hash functions, the HMAC construction—see "Mihir Bellare, Ran Canetti and Hugo Krawczyk, Keying hash functions for message authentication, In Neal Koblitz, editor, Proceedings of CRYPTO '96, volume 1109 of Lecture Notes in Computer Science, Pages 1-15, Springer, 1996"—has found the widest use. In particular, it is used very often in the IETF environment, e.g., in the case of IPsec and http-digest. HMAC is based on the twice-repeated, nested hashing of a message x, using a secret key K with a suitable hash function H.

$HMAC_K(x) := H(K \oplus opad \| H(K \oplus ipad | x))$

The two strings—ipad, inner-padding and opad, outer-padding—are predefined string constants. In contrast to MACs based on block ciphers, there are not a multitude of padding methods and optional processes in the case of the HMAC construction.

For instance, HMAC-SHA-1, H=SHA-1, m=96, i.e., only 96 most significant bits of the 160-bit output, and HMAC-SHA-256, H=SHA-256, m=96, i.e., only 96 most significant bits of the 256-bit output, are widespread; see IPSec, for instance. HMAC was considered in the context of the sensor protection; however, it is considerably more costly than the arrangement for obtaining the objective proposed ultimately in the specific exemplary embodiment.

In the following, MACs based on block ciphers are explained. Let $x_1, x_2, \ldots x_{t'}$ be the blocks of message texts, e.g., with the block length n=128 for the algorithm Enc=AES or the block length n=64 for the algorithms Enc=DES, Triple DES, IDEA or PRESENT, that is:

$n = x_1 = \ldots = x_{t'-1}$

The number of blocks prior to the "padding" is denoted by t'; in this context, if appropriate, the last block may include less than n bits, that is, $0 < x_{t'} \leq n$. After the padding, t message text blocks, $x_1 \ldots, x_t$ are obtained, the following applying depending on the padding method:

Padding Method 1: The plaintext is filled with no or a plurality of 0-bits, until a multiple of the block length n is reached, i.e., t=t'. For this, see "A. J. Menezes, P. C. van Oorschot, and S. A. Vanstone, Handbook of Applied Cryptography, CRC Press, 1996, Algorithm 9.29, page 334."

Padding Method 2: One 1-bit is appended to the plaintext; after that, filling with 0-bits is performed until a multiple of the block length n is reached, i.e., t=t' or t=t'+1. For this, see "A. J. Menezes, P. C. van Oorschot, and S. A. Vanstone, Handbook of Applied Cryptography, CRC Press, 1996, Algorithm 9.30, pages 334-335."

Padding Method 3: Encode the length of the original message in a length block L, mostly 64 bit, if necessary, fill up with 0-bits left-justified. Fill the original message with no or a plurality of 0-bits until a multiple of the block length n is reached; append length block L, i.e., t=t' or t=t'+1.

Padding Method 3 was first added in the 1999 version, see "ISO/IEC 9797-1, Information technology—Security techniques—Message Authentication Codes (MACs) Part 1: Mechanisms using a block cipher, ISO/IEC, 1999" of the Standards for Message Authentication Codes, and was not included in previous versions, see "ISO/IPC 9797, Information technology—Security techniques. Data integrity mechanisms using a cryptographic check function employing block cipher algorithm, ISO/IEC, 1994." This padding method is also used in the case of hash functions.

The first padding method has poorer security properties than methods 2 and 3.

For the sake of simplicity, it is assumed that these message text data already include additional randomization data, which are used for defense against what are termed replay attacks; more about this is indicated hereinafter.

Thus, let $x_1, \ldots, x_t$ be the pressure values, message text, padded and possibly supplemented by randomization data. For instance, in the concrete exemplary embodiment of RP-sensor protection, the following is specifically planned at the moment:

$Enc_K$—Encryption algorithm AES with key K
k—Length of key K in bits, here k=128
n—Block width of the encryption algorithm, here n=128
t—Number of blocks, here t=16

In the case of the Message Authentication Codes, which are based on block ciphers, the CBC-MAC construction is the most widespread. Let IV be an initialization vector of the length n. In contrast to CBC-encryption, in the case of the CBC-MAC, the value $IV = 0^n$ may be selected.

$H_0 := IV = 0^n$ Initialization
$H_i := Enc_K(H_{i-1} \oplus x_i) i = 1, \ldots, t$ CBC mode
$MAC_K(x) := g(H_t)$ Output transformation In the following, it must be noted:

(i) In Appendix A of the Standard "ISO/IPC 9797, Information technology—Security techniques—Data integrity mechanisms using a cryptographic check function employing block cipher algorithm, ISO/TEC, 1994", in addition, two optional processes are defined:

Optional process 1: In the case of the first optional process, the last block $H_t$ is treated again separately with a second independent key $K_2$: the last block $H_t$ is decrypted with $K_2$ and encrypted with $K_1$. This corresponds to $g(H_t) := Enc_{K1}(Dec_{K2}(H_t))$. This process is called MAC-strengthening, and is used to defend against specific chosen-text existential forgery attacks.

Optional process 2: The second optional process includes the repeated encryption of the last block with the aid of a second key $K_2$, that is, $MAC := g(H_t) = Enc_{K2}(H_t)$.

(ii) The new Standard, see "ISO/IEC 9797-1, Information technology—Security techniques—Message Authentication Codes (MACS) Part 1: Mechanisms using a block cipher, ISO/IEC, 1999", contains no more optional processes, but instead, specifies six different MAC-algorithms, which in each instance may be combined with the three different padding methods. The MAC-algorithms 4 to 5 are new schemes. Because of new cryptoanalytical knowledge from 2003, two of the methods proposed there are no longer to be regarded as suitable. The old, proven algorithms are:

1. CBC-MAC without optional processes: customary CBC-MAC, that is, $g(H_t) = H_t$.

In the year 2000, Bellare, Kilian and Rogaway, see "M. Bellare, J. Kilian, and F. Rogaway, The security of cipher block chaining, Journal of Computer and System Sciences, 3(61):362-399, 2000", were able to show that this CBC-MAC is secure when working with messages of fixed length if the underlying block cipher is secure, i.e., is a pseudo random function. It is noteworthy that there immediately are attacks in the case of messages of variable length, e.g., $MAC_K(x(x \oplus MAC_K(x))) = MAC_K(x)$. Therefore, this simple CBC-MAC is not used in practice.

2. CBC-MAC with optional process 1: Retail-MAC. This MAC, where $g(H_t) = msb_{63 \ldots 32} Enc_{K1}(Dec_{K2}(H_t))$, was used for the first time for DES in the retail-banking field, therefore the name, that is, m=n/2=32, n=64, Enc-DES, k=56 for $K_1$ and $K_2$. The modification of the CBC-MAC in such a way that the complete last n-bit block $g(H_t)$ is not used as MAC, but rather only the m left-justified bits thereof, is used for security against exhaustive key attacks. Often m=n/2 in practice. The use of this CBC-MAC method for the integrity of sensor data was proposed for the first time in the RP-sensor workshop on Oct. 29, 2008. If DES is employed as encryption algorithm, it makes no great difference in implementation expenditure, both in software and in hardware, whether one uses only encryption or encryption and decryption. In the case of AES, however, the overhead for a decryption is substantially greater compared to an encryption. Therefore, in the next sessions, the following method was proposed, which makes due with only encryption.

3. CBC-MAC with optional process 2: EMAC: This scheme uses as output transformation: $g(H_t) = Enc_{K2}(H_t) = Enc_{K2}(Enc_{K1}(H_{t-1} \oplus x_t))$ with a second key $K_2$. The EMAC-construction was first proposed by the RIPE consortium in the year 1995. With this scheme, Petrank/Rackoff, see "E. Petrank and C. Rackoff, CBC MAC for real-time data sources, Journal of Cryptology, 3(13):315-338, 2000", succeeded for the first time in proving the security of CBC-MACs when working with inputs of variable length. This scheme is proposed as realization option for the sensor protection, specifically Enc–AES, k=128 for keys $K_1$ and $K_2$, n=128, m=m/2=54.

(iii) A further optimization by Black and Rogaway reduces the overhead due to the padding. The XCBC- or Three-Key MAC, see "J. Black and P. Rogawa, CBC MACs for arbitrary-length messages, In Mihir Bellare, editor, Advances in Cryptology CRYPTO 2000, number 1880 in Lecture Notes in Computer Science, Pages 197-215, Springer-Verlag, 2000", uses one k-bit key $K_1$ for the block cipher and two n-bit keys $K_2$ and $K_3$ for the "key whitening", see "T. Schütze, Algorithmen für eine Crypto-Library für Embedded Systems [Algorithms für a Crypto-Library for Embedded Systems], Technical report, Robert Bosch GmbH, CR/AEA, August 2007, Internal document, Version 1.0, 2007-08-07, 46 pages" for the basic idea of the XOR-Encrypt-XOR approach. The XCBC-MAC modifies the last encryption and the padding in such a way that the number of blocks before and after padding is the same, i.e., t=t':

If $x_{t'}=n$, then $x_t=x_t \oplus K_2$.

Otherwise, append one '1'-bit and $j=n-x_{t'}-1$ '0'-bits and $x_t=(x_t10^j) \oplus K_3$.

(iv) Naturally, yet another key $K_3$ is less advantageous. The OMAC-algorithm of Iwata and Kurosawa, see "T. Iwata and K. Kurosawa. GMAC: One key CBC MAC, In T. Johannson, editor, Fast Software Encryption, number 2887 in Lecture Notes in Computer Science, Pages 129-153, Springer-Verlag, 2003", reduces the outlay to one key by especially selecting $K_2 = '2' \times Enc_{K1}(0^n)$ and $K_3 = '4' \times Enc_{K1}(0^n)$.

It should be mentioned that '2' and '4' are two elements in the Galois field $GF(2^n)$, and that x denotes the multiplication in this field.

It is anticipated that NIST will standardize this algorithm under the name CMAC. For this, see "Morris Dworkin, Cipher Modes of Operation: The CMAC Mode for Authentication, NIST Special Publication 800-38b, National Institute of Standards and Technology NIST, May 2005", see "http://csrc.nist.gov/publications/nistpubs/800-38b/sp800-38b.pdf, Pages 2 and 3."

For the exemplary embodiment, it is proposed to examine this algorithm OMAC or CMAC as Message Authentication Code for the sensor protection parallel to the EMAC.

(v) In the case of the CBC-encryption, naturally all encrypted blocks are output; in the case of the CBC-MAC, only the last block. There are not only technical reasons for this. A CBC-MAC method which outputs all $H_i$ is insecure; see "Jonathan Kahtz and Yehuda Lindell, Introduction to Modern Cryptography, CRC Publishing, 2007, Page 126."

In the following, the proposed integrity-protection method is described and summarized. As till now, $x=(x_1, \ldots, x_t)$ denotes the blocks of message texts, pressure values, with the block length n, Enc={AES, PRESENT} the symmetrical block cipher, i.e., k=128 and n=128 or n=64. After the padding—padding methods 1 or 2 may be chosen—one obtains t message text blocks $x=(x_1, \ldots, x_t)$. In order to be able to present concrete numbers, the realization planned at the moment for the RP-sensor is selected for the following description:

t=16 Blocks
Enc AES, k=128, n=128
Padding Method 1

In the following, the EMAC is explained:
$H_0 := IV = 0^{128}$ Initialization
$H_i := Enc_{K_{AB}, MAC1}(H_{i-1} \oplus x_i)$ i=1, ..., t CBC mode
$MAC_K(x) := msb_{127 \ldots 64}[Enc_{K_{AB}, MAC2}(Ht)]$ Output transformation
with the two 128-bit MAC keys $K_{AB, MAC1}$ and $K_{AB, MAC2}$, m=n/2=64, i.e., truncation of MAC output, and the Output-Transformation $EnC_{K_{AB}, MAC2}(H_t)$.

In the case of the variant considered at the moment, the number of bits 2048 is divisible by the block length 128, that is, padding method 1 is equivalent to no padding. For general practical applications of this security concept, padding method 2 is strongly recommended; otherwise, the method should really only be used for input of fixed length. The security proof for the method EMAC is found in "E. Petrank and C. Rackoff, CBC MAC for real-time data sources, Journal of Cryptology, 3(13):315-338, 2000", i.e., existentially unforgeable under adaptive chosen-message attacks for variable input length. The method is standardized in "ISO/IEC 9797-2, Information technology—Security techniques—Message Authentication Codes MACs—Part 2: Mechanisms using a dedicated hash function, ISO/IEC; 2002." The expenditure is made up essentially of t+1 call-ups of the block cipher.

In the following, the CMAC/OMAC is discussed. Let K or $K_{AB,MAC1}$ be the 128-bit MAC key; $K_1, K_2$ denote two 128-bit derived keys. Furthermore, as usual, let $x_1, \ldots, x_{t-1}, x'_t$ be the blocks of message texts of the block length n (n=128 for AES). For the CMAC method, t'=t applies, that is, the number of blocks before and after post-processing (padding) of the last block is the same; even $x_t=x'_t$ applies, that is, the number of bits in the last block is the same, however $x'_t=x_t$ does not apply. Rather, the last block is modified by the XCBC construction.

In the following, an algorithm for the subkey generation in the case of CMAC is explained.

Input: Key K, Output: Subkeys $K_1, K_2$
S1: $L := Enc_K(0^{128})$;
S2: if (msb(L)=0) then $K_1 := (L<<1)$ else $K_1 := (L<<1) \oplus R_b$;
S3: if (msb($K_1$)=0) then $K_2 := (K_1<<1)$ else $K_2 := (K_1<<1) \oplus R_b$;

The constant $R_b := 0x0 \ldots 087$ for a block cipher of block width 128, that is, for example, AES, and $R_B := 0x0 \ldots 01B$ for a 64-bit block-length cipher, e.g., Triple DES. If $x'_t=n$, that is, the last block $x'_t$ is complete, then
$xt := K_1 \oplus x'_t$, else $xt := K_2 \oplus (x'_t \| 10^j)$
where $j=n-x'_t-1$. With these message blocks $x_1, \ldots x_t$, altered only in the last block compared to the original data, the standard CBC-MAC algorithm is now implemented; if needed, the output may be cut off except for 64 bits:
$H_0 := IV = 0^{128}$ Initialization
$H_i := Enc_{K_{AB,MAC1}}(H_{i-1} \oplus x_i)$ i=1, ..., t CBC mode
$MAC_K(x) := msb_{127 \ldots 64}(H_t)$ Output transformation In contrast to the EMAC, when working with the CMAC method, even given a number of bits which is not divisible by the block length, no block must additionally be appended.

Only one 128-bit MAC-key $K_{AB, MAC1}$ is needed. For description and security of the method, reference is made to "T. Iwata and K. Kurosawa, OMAC: One key CBC MAC, In T. Johannson, editor, Fast Software Encryption, number 2887 in Lecture Notes in Computer Science, Pages 129-153, Springer-Verlag, 2003" and "Morris Dworkin, Cipher Modes of Operation: The CMAC Mode for Authentication, NIST Special Publication 800-38b, National Institute of Standards and Technology (NIST), May 2005", see also "http://csrc.nist.gov/publications/nistpubs/800-38b/sp800-38b.pdf." At present, the method is being standardized at the NIST. The outlay is made up of t call-ups of the block cipher, a one-time precalculation of $Enc_K('0')$, as well as the $GF(2^{128})$ or shift operations.

Whether the method CMAC can really be realized faster and, above all, in a more space-saving or memory-space saving manner in practice than EMAC is wholly dependent on the implementation of the block cipher and the combinatory overhead in the case of the CMAC. Details can only be announced after various implementation tests. The MAC-calculation or verification takes place essentially alike on sensor side (A) and control-unit side (B).

Figure 5:
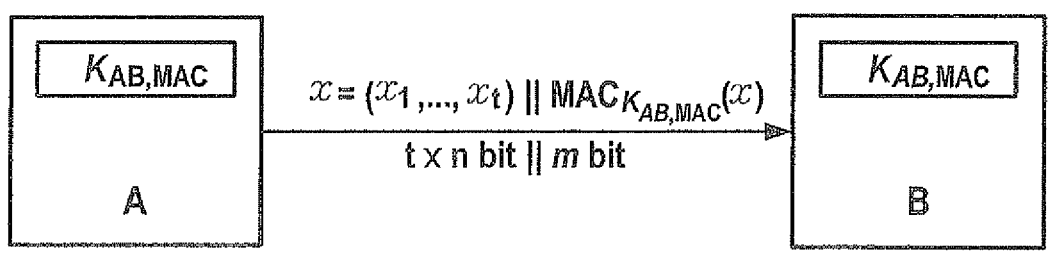
FIG. 5 show a schematic representation for clarifying a protection of the integrity of sensor data by message authentication codes EMAC or CMAC.

FIG. 5 shows a schematic representation for clarifying an integrity protection of the sensor data by Message Authentication Codes EMAC or CMAC:
A: Calculate 64-bit MAC-value with the aid of common keys $K=K_{AB,MAC}$ either $K_{AB,MAC}=K_{AB,MAC1}$, $K_{AB,MAC2}$ in the case of EMAC or only $K_{AB,MAC}=K_{AB,MAC1}$ in the case of CMAC, from the t input blocks $x=(x_1, \ldots, x_t)$, in each instance of length n:

$$MAC_K(x) := \begin{cases} EMAC_k(x) \\ CMAC_K(x) \end{cases}$$

Send MAC-value together with message texts $x=(x_1, \ldots, x_t)$ to B
$A \rightarrow B$: $x_1, \ldots, x_t$, $MAC_K(x)$ t×n bits, m bits=2048 bits, 64 bits
B: receives message texts $x_1, \ldots, x_t$ in plaintext, is able to relay them immediately for further processing without latency delay, and on its part, calculates $MAC_K(x)$ and finally compares [it] to the MAC-value transmitted by A. In the case of non-equality, an error signal is generated, which is to be suitably processed.

In the following, a method for preventing replay attacks is described as a further part of the overall security concept. Since a Message Authentication Code should always be independent of the semantics of the data, very wisely, no time-dependent state is incorporated into the construction of MACs. Thus, if the data $x=(x_1, \ldots, x_t)$ in the above protocol were only pure pressure data, then an attacker/tuner could record engine situations or pressure characteristics (full throttle) of interest for him, and replay them later. In order to prevent this scenario, in addition to the data, random elements (random numbers, time-variant parameters) are inserted into the contents of the message, i.e., the integrity-protection method, the MAC, itself remains unchanged. Because of efficiency considerations and estimations of the possibilities for a local database with recorded pressure data, it is proposed, for example, to insert at least r=32 bits of random data $R_A$ into each t×n=16×128=2048-bit block. From the standpoint of cryptography, if applicable, even r=48 bits of random data could be recommended. Since it must be assumed that the actual pressure data transmitted also still have a certain entropy, this compromise is further pursued in the following. The actual distribution, that is, at what position pressure data come and when random bits come, is cryptographically unimportant. The proposal for the RP-sensor exemplary embodiment is as follows: 9 bits pressure data×224+r=32 bits random numbers $(R_A)=2048=128×16=t×n$. With that, replay attacks are effectively prevented in the integrity protection. An attacker would have to completely record at least $2^{32+Entropy(x)}$ protocol runs.

In the following, it is demonstrated how, in the decisive fourth step of the security concept according to the exemplary embodiments and/or exemplary methods of the present invention, a "transaction authentication" is obtained by skillful linking of both methods. What is needed for the sensor protection is more than a pure message authentication, namely, uniqueness and freshness, as well. Reference is made to "A. J. Menezes, P. C. van Oorschot, and S. A. Vanstone, Handbook of Applied Cryptography, CRC Press, 1996, Table 9.10, Page 362." The table of types of authentication specified in this literature reference appears as follows:

|  | Identification of source | Data integrity | Timeliness or uniqueness | Defined in |
|---|---|---|---|---|
| Message auth. | Yes | Yes | — | §9.6.1 |
| Transaction auth. | Yes | Yes | Yes | §9.6.1 |
| Entity auth. | Yes | — | Yes | §10.1.1 |
| Key auth. | Yes | Yes | Desirable | §12.2.1 |

No freshness is achieved by the MAC for integrity security (first row). For that purpose, the authentication is used, here the next-to-last row called Entity Authentication. One sees here that a Transaction Authentication would be the best. However, this requires Message Authentication and correspondingly long time-variant parameters in each data packet. Thus, for instance, a MAC about the pressure data and a sufficiently long time stamp or a (synchronized) counter. Since there is normally neither a clock nor a synchronous counter on the sensor, the combination of row 3 (entity authentication) and row 1 (message authentication, integrity protection) was therefore selected.

At this point comes the decisive linking of both protocols. In the case of the authentication, control unit B sends, for example, a 64-bit random number $R_B$ to sensor A. In the case of the integrity protection, the sensor sends, for example, a 32-bit random number $R_A$ to the control unit.

Now, for example, the 32 least significant bits of $R_B$ are used for $R_A$ at the beginning, and in each step, that is, every t×n=2048 bits, the value of $R_A$ is counted up by one. In this manner, both protocols are securely linked cryptographically. The knowledge of the $lsb(R_B)$ used as sequence counter is useless to an attacker, since it is reselected by the control unit upon each authentication. Moreover, the implementation of a random-number generator may be omitted on sensor side A, since all random numbers come from control unit B. However, today there are already deterministic RNGs on control units.

Figure 6A:
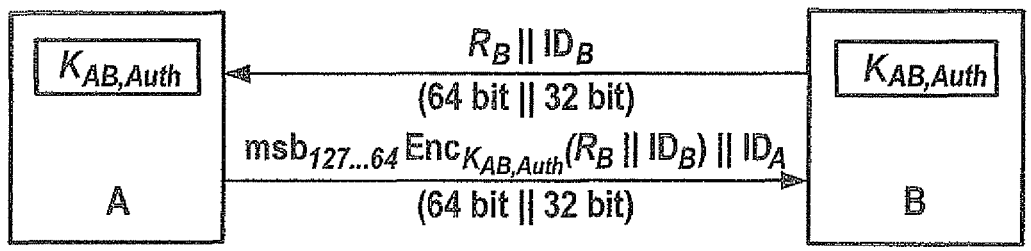
FIG. 6A and FIG. 6B show a schematic representation for clarifying an overall protocol of a connection according to the present invention of authentication and integrity protection, or authentication and transaction authentication, for the transaction security of the sensor data.
Figure 6B:
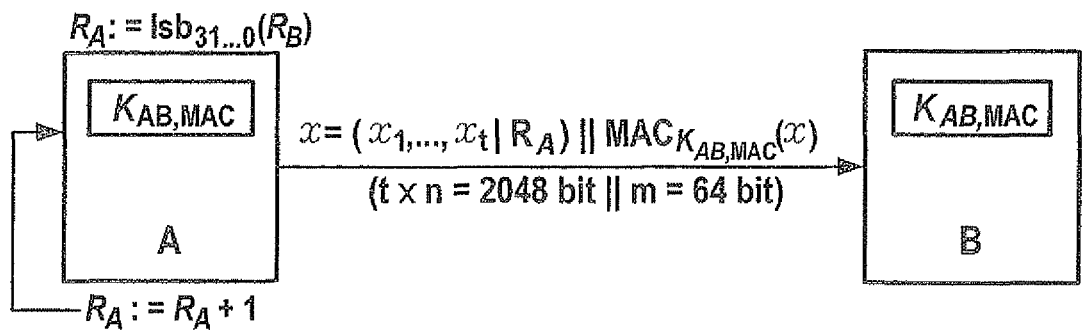

FIGS. 6A and 6B show a schematic representation for clarifying an overall protocol of a linkage of integrity protection and authentication for the transaction security of sensor data. In the case of the overall protocol shown in the Figure, the pressure data are written in the form $(x_1, \ldots, x_t, R_A)$ for the purpose of illustrating the dependency of the inserted random bits.

An important question for the implementation is now how often the integrity-protection protocol step may be performed without a repetition of sequence counter $R_A$ occurring. It is assumed that the 32-bit counter simply overflows (unsigned int wrap), that is, one is able to transmit $2^{32} \times (2048-32)$ bits of pressure data. At a data-transmission rate of 8000×9 bits per second, a repetition of the counter occurs after $$\frac{2^{32} \times (2^{10} - 2^5)}{8000 \times 9 \text{ s}^{-1}} \approx 5.9 \times 10^7 \text{ s} \approx 684 \text{ days}$$

A re-authentication should be carried out after this time at the latest. Control unit B itself sends random number $R_B$ to the sensor; therefore it is also able to calculate the starting value for the sequence counter $R_A$=lsb$_{31 \ldots 0}$($R_B$). With each data packet, that is, every t x n bits, the control unit receives a new value R'$_A$. If the transmitted value R'$_A$ is within a certain window of [$R_A$, $R_A$+$R_A$], e.g., $R_A$:=3, then the control unit accepts this sequence counter and sets $R_A$:=1. It is important that the sensor is not able to reset the sequence counter of its own accord—see poor design solution in the case of KeeLoq. In the normal case, that is, without packet losses, one should get along with $R_A$:=0, i.e., $R_A$ is incremented by only one with each packet.

At this point, it is specifically emphasized that a transaction authentication, i.e., integrity of the transmitter, integrity of the data as well as the freshness, may be achieved either with a bidirectional communication protocol (challenge-response) or with a global, independent time stamp or sequence counter. The claimant/prover, in this case, the sensor, must not be in the position to reset the counter or the clock. This can lead to denial-of-service attacks, as in the case of KeeLoq. The counter is only accepted in a specific validity window; the attacker manipulates the counter so that it is always invalid. Hence, it follows that the sensor is not accepted or must be reprogrammed. In the case of vehicle immobilization systems, it is assumed that the authenticating vehicle key itself is tamper-resistant, and in this way, no unnatural counters are able to be generated. Should the internal counter of a vehicle key deviate by several 100000 from the last authorized counter, then usually the vehicle key must be reprogrammed.

One advantage of the exemplary embodiments and/or exemplary methods of the present invention is that the security goals considered are achieved reliably in a cryptographically provable manner, in contrast to methods proposed till now. Thus, it would be the first cryptographic method for sensor protection in the automotive sector. It is distinguished by a solid, theoretical foundation, a careful selection of the cryptographic mechanisms for realizing the security goals while taking the special requirements in the embedded systems area into consideration, as well as by the coupling of the authentication and the integrity protection. Due to this special form of the cryptographic coupling, the necessity of a secure random-number generator even becomes null and void on the side of the sensor. A random-number generator is needed only on the part of the ECU. The proposed implementation uses the basic mechanism of symmetrical block encryption, realized by AES or possibly PRESENT, as the fundamental tool. Thus, different mechanisms do not have to be implemented, and an effective reuse may be realized, within this practical application, as well as in other cryptographic tasks on the control unit.

Methods from the related art have either a markedly lower level of security (insecure and/or proprietary algorithms) or are considerably more costly than the design approach presented.

In the following, a detailed description of the method as a summary of the final protocol is stated. Hereinafter, let A denote the RP-sensor and B the automotive control unit. Furthermore, let $ID_A$ and $ID_B$ each be 32-bit long identities of A and B, respectively, for example, serial numbers or type part numbers. In this and the following passages, specific bit lengths are named as example. Otherwise, the scheme is freely parameterizable, nor is it restricted to the RP-sensor. However, in the event the block length is exceeded, e.g., in the case of ABS 128 bits, if necessary, a few mechanisms must be modified slightly, for example, CBC-encryption with padding instead of ECB-mode for the authentication step.

Both users in the system possess symmetrical keys introduced beforehand: one common 128-bit ABS-key $K_{AB,Auth}$ for the authentication as well as one common 128-bit AES-key $K_{AB,MAC1}$ for the message authentication code CMAC, or two common 128-bit AES-keys $K_{AB,MAC1}$, $K_{AB,MAC2}$ for the message authentication code EMAC.

In addition, the overall protocol is shown in FIG. 6.

1. B: In a first step, control unit B generates a cryptographically secure 64-bit random number $R_B$. To that end, either a deterministic random-number generator (pseudo-RNG) of the class K3 medium or high (or better, K4 high) having a sufficiently good seed (entropy≥128 bits) is used, or alternatively, a physical random-number generator of the class P1 medium or high (better, P2 high).

B→A: $R_B$ $ID_B$

Random number $R_B$, concatenated with identity $ID_B$, is sent via the bidirectional PSI5-channel to RP-sensor A.

2. A: Using a symmetrical ABS-key $K_{AB,Auth}$ of 128-bit length, RP-sensor A encrypts received data packet ($R_B$ $ID_B$) of 96-bit length. In so doing, ($R_B$ $ID_B$) is padded with '0'-bits up to the length of 128 bits. The 64 most significant bits are taken from the result $\text{Enc}_{K_{AB,Auth}}(R_B \text{ } ID_B)$ of the length of 128 bits obtained and sent back, together with identity $ID_A$, to control unit B.

A→B msb$_{127 \ldots 64}$[$\text{Enc}_{K_{AB,Auth}}(R_B \text{ } ID_B)$] $ID_A$

3. B: Immediately after the data $R_B$ $ID_B$ were sent to the sensor in step 1, control unit B on its part is able to begin calculating msb$_{127 \ldots 64}$[$\text{Enc}_{K_{AB,Auth}}(R_B \text{ } ID_E)$]. It compares the data received from step 2A, both msb$_{127 \ldots 64}$[$\text{Enc}_{K_{AB,Auth}}(R_B \text{ } ID_B)$] and $ID_A$. Only in the event that both values agree in each instance is the protocol continued, the sensor is authenticated with respect to the control unit. In the case that only one value deviates, an error message "authentication of sensor failed" is generated.

4. A: The sensor stores the 32 least significant bits of 64-bit random number $R_B$ as 32-bit sequence counter $R_A$. Let x=($x_1, \ldots, x'_t R_A$) be the pressure data enhanced by random number $R_A$, subdivided, for example, into t=16 blocks of the length n=128. In the case of the RP-sensor, one possible allocation is 9 bit×224 pressure data 32-bit random number $R_A$=2048 bits=t×n. Other allocations are also conceivable; the 32 bits of random number $R_A$ are important. In the following, we differentiate between two possibilities for calculating a message authentication code, EMAC and CMAC, respectively. If the data length is not divisible by 128, i.e., x≠0 mod 128 or x'$_t$<n, that is, the last block is not completely filled, then in the case of the EMAC, the last block is filled with '0'-bits, padding method 1, $x_t$=x'$_t$ 0 . . . 0→x=($x_1, \ldots, x_t R_A$).

One observes that the EMAC should only be used with this padding method, i.e., effectively no padding, in the case of blocks of fixed length, in the example, only for 2048 bits. In the case of the CMAC method, the two sub-keys $K_1$ and $K_2$, respectively, are calculated from the key $K=K_{AB, MAC1}$ with the aid of the algorithm for sub-key generation when working with CMAC.

S0: $R_b:=0x0 \ldots 087$;
S1: $L:=Enc_K(0^{128})$; (one-time precalculation)
S2: if (msb(L)=0) then $K_1:=(L<<1)$ else $K_1:=(L<<1)\oplus R_b$;
S3: if (msb($K_1$)=0) then $K_2:=(K_1<<1)$ else $K_2:=(K_1<<1)\oplus R_b$;

If the following applies: $x'_t=n$, i.e., the last block is completely filled, then $x_b:=K_1\oplus x'_t$, else $x_t:=K_2\alpha(x'_t 10^j)$ where $j=n-x'_t-1$. Since in this application, the data length and therefore $x'_t$ have been fixed beforehand, besides key $K_{AB, MAC1}$, stored in the NVM, only one further volatile key $K_1$ or $K_2$ is thus needed. This key may be calculated on-the-fly during the startup.

In both cases, EMAC and CMAC, one now has $t=16$ blocks of the length $n=128$, i.e., $x=(x_1, \ldots, x_t R_a)$. For these data, sensor A may initiate the CBC-process, that is:
$H_0:=IV=0^{128}$ Initialization
$H_i:=Enc_{K\_AB,MAC1}(H_{i-1}\oplus x_i)$ $i=1, \ldots, t$ CBC mode In the case of the EMAC, last block $H_t$ is again encrypted with a further key $K_{AB,MAC2}$: $EMAC'_K(x):=Enc_{KAB,MAC2}(H_t)$.

In both cases, only the 64 most significant bits from the last result are used as MAC-value: $EMAC_K(x):=msb_{127\ldots 64}EMAC'_K(x)=msb_{127\ldots 64}[Enc_{K\_AB,MAC2}(H_t)]$ or $CMAC_K(x)$ $msb_{127\ldots 64}(H_t)$.

The $m=64$-bit MAC value $MAC_K()$ together with the original data $x=(x_1, \ldots, x'_t R_A)$, is transmitted via the PSI5 channel to the control unit. The intermediate values $H_1, \ldots, H_t$ must not be made known. Finally, sequence counter $R_A$ is increased by one.

5. B: Control unit B receives original pressure data $x_1, \ldots, x'_t$ and passes them on, unaltered, directly to the engine management. With received data $x=(x_1, \ldots, x'_t R_A)$, the MAC-value is now calculated on the side of the control unit and compared to the received MAC-value. In the event the values are different, an error counter $C_{integrityerror}$ is incremented. If this counter is above a certain limit $C_{integrityerror}$, then an error message "message authentication of sensor data failed repeatedly" is generated. If both MAC-values agree, then $C_{integrityerror}$ is reset. Since the control unit itself has sent the initial value for $R_A$, it is able to check whether the transmitted sequence counter $R'_A$ lies within the interval $[R_A, R_A+R_A]$, where, for example, $R_A:=3$. If yes, it accepts counter $R_A:=R'_A$ and performs the calculations above. If $R_A \notin [R_A, R_A+R_A]$, then sensor A and control unit B have evidently lost too many packets or the synchronism has gotten lost. A re-authentication should then be carried out, inter alfa, for the renegotiation of $R_A$. After the MAC-calculation and comparison, $R_A$ is incremented by one. The method is continued in step 4A with the further message authentication code for the integrity security.

There are alternatives to the exemplary embodiment of the overall security concept according to the present invention presented. For example, in addition to being realized by random numbers, time-variant parameters $R_A$ may also be realized by time stamps or sequence counters. Furthermore, in the example, the least significant bits of $R_B$ are utilized for $R_A$. However, other possibilities for linking $R_A$ and $R_B$ also present themselves: For example, another part of $R_B$ or several parts of $R_B$ or—given equal length—$R_A=R_B$, as well. It is also possible to utilize a function of $R_B$ for $R_A$, e.g., to utilize $R_B$ several times or parts of $R_B$ several times, or to determine $R_A$ from $R_B$ according to a formula.

In each step of the transaction authentication, $R_A$ is incremented by 1 in the exemplary embodiment presented above. Other incrementations or perhaps other changes according to fixed rules are also conceivable for this, and may be advantageous. The (cryptographic) methods which may be used here for the authentication and for integrity protection, or for the transaction authentication, are also merely by way of example and may also be replaced by other alternative methods indicated in the description, or even by comparable methods not indicated.

Since the RP-sensor and the control unit communicate via the public PSI5 channel, the individual messages of the protocol may be tracked well. Thus, it may be assumed that the entire protocol may be verified very well. On the other hand, the contents of the MAC-value appear random for a third-party observer; this is also the idea of the message authentication code. The utilization of the cryptographic methods employed may be verified relatively reliably by analysis of the block lengths, the length of the MACs and by side-channel analyses.

Just now, a use of an RP-sensor secure against manipulation is also very advantageous in the automobile sector. There, a 100% recognition of manipulations is often explicitly demanded. A simple encryption of the data is frequently not sufficient. The concept presented is universally applicable; it is not restricted to the case of an RP-sensor with PSI5 interface.

What is claimed is:

1. A method for protecting a sensor device and sensor data of the sensor device from manipulation, the method comprising:
   sending, by a control unit, to the sensor device, and during authentication of the sensor device, a first data packet including a first time-variant parameter concatenated with an identity of the control unit;
   receiving, by the control unit, a second data packet, the second data packet having been generated by the sensor device by:
   encrypting the first data packet using a key of determined bit length, wherein, when a bit length of the first data packet is less than the bit length of the key, the encrypting includes padding the first data packet with additional bits; and
   concatenating a first determined number of bits of the encrypted first data packet with an identity of the sensor device;
   comparing, by the control unit, the second data packet with a calculated value of the first determined number of bits of the encrypted first data packet; and
   receiving, by the control unit, the sensor data, together with an integrity protection value, the integrity protection value having been generated by the sensor device based on a second time-variant parameter generated from a second determined number of bits of the first time-variant parameter;
   wherein one of a random number, a part of the random number, and a number obtained from the random number by a function is utilized as the time-variant parameters in the authentication of the sensor device.

2. The method of claim 1, wherein the time-variant parameters are altered in each step of a transaction authentication.

3. The method of claim 2, wherein the alteration of the time-variant parameters corresponds to a stepwise incrementation.

4. The method of claim 1, wherein the sensor device is authenticated according to a challenge-response method.

5. The method of claim 1, wherein the integrity of the sensor data is protected according to a message authentication code ("MAC") method.

6. The method of claim 5, wherein a one-key message authentication code ("OMAC") method or an encrypted message authentication code ("EMAC") method is used as the MAC method.

7. The method of claim 1, wherein the time-variant parameters are realized by time stamps, sequence counters or random numbers.

8. The method of claim 1, wherein the first determined number of bits are most significant bits of the encrypted first data packet, and the second determined number of bits are least significant bits of the first time-variant parameter.

9. A control unit comprising:
a processor configured to:
send to a sensor device, during authentication of the sensor device, a first data packet including a first time-variant parameter concatenated with an identity of the control unit;
receive a second data packet having been generated by the sensor device by:
encrypting the first data packet using a key of determined bit length, wherein, when a bit length of the first data packet is less than the bit length of the key, the encrypting includes padding the first data packet with additional bits; and
concatenating a first determined number of bits of the encrypted first data packet with an identity of the sensor device;
compare the second data packet with a calculated value of the first determined number of bits of the encrypted first data packet; and
receive from the sensor device sensor data together with an integrity protection value, the integrity protection value having been generated by the sensor device based on a second time-variant parameter generated from a second determined number of bits of the first time-variant parameter;
wherein one of a random number, a part of the random number, and a number obtained from the random number by a function is utilized as the time-variant parameters.

10. The control unit of claim 9, wherein the sensor device has an arrangement for altering the time-variant parameters in each step of a transaction authentication.

11. The control unit of claim 10, wherein the alteration of the time-variant parameters corresponds to a stepwise incrementation.

12. The control unit of claim 9, wherein the first determined number of bits are most significant bits of the encrypted first data packet, and the second determined number of bits are least significant bits of the first time-variant parameter.

* * * * *